(12) United States Patent
Shen et al.

(10) Patent No.: US 9,382,124 B2
(45) Date of Patent: Jul. 5, 2016

(54) SYNTHESIS METHOD FOR ETS-10 TITANOSILICATE MOLECULAR SIEVE

(71) Applicants: China National Petroleum Corporation, Beijing (CN); China University of Petroleum-Beijing(CUPB), Beijing (CN)

(72) Inventors: Baojian Shen, Beijing (CN); Jing Li, Beijing (CN); Xiaohua Wang, Beijing (CN); Wencheng Zhang, Heilongjiang Province (CN); Qiaoxia Guo, Beijing (CN); Bojun Shen, Beijing (CN); Bing Feng, Beijing (CN); Guangming Wen, Heilongjiang Province (CN); Zhihua Zhang, Heilongjiang Province (CN); Ran Tian, Heilongjiang Province (CN)

(73) Assignees: China University of Petroleum-Beijing (CUPB), Beijing (CN); China National Petroleum Corporation, Beijing (CN)

( * ) Notice: Subject to any disclaimer, the term of this patent is extended or adjusted under 35 U.S.C. 154(b) by 708 days.

(21) Appl. No.: 13/713,490

(22) Filed: Dec. 13, 2012

(65) Prior Publication Data

US 2013/0149235 A1 Jun. 13, 2013

(30) Foreign Application Priority Data

Dec. 13, 2011 (CN) .......................... 2011 1 0415384

(51) Int. Cl.
*C01B 39/08* (2006.01)
*B01J 32/00* (2006.01)
*B01J 29/89* (2006.01)
*B01J 35/00* (2006.01)

(52) U.S. Cl.
CPC ............... *C01B 39/085* (2013.01); *B01J 29/89* (2013.01); *B01J 32/00* (2013.01); *B01J 35/002* (2013.01)

(58) Field of Classification Search
CPC ......... C01B 39/085; B01J 29/89; B01J 32/00; B01J 35/002
See application file for complete search history.

(56) References Cited

U.S. PATENT DOCUMENTS 4,853,202 A    8/1989  Kuznicki

FOREIGN PATENT DOCUMENTS

| CN | 1706749 | * 12/2005 |
| CN | 1724360 A | 1/2006 |
| CN | 101172616 A | 5/2008 |
| CN | 101767798 A | 7/2010 |

OTHER PUBLICATIONS

Lv et al, "A reinforced study on the synthesis of microporous titanosilicate ETS-10", Microporous and Mesoporous Materials 76 (2004) 113-122.*
LV, L. et al. "A reinforced study on the synthesis of microporous titanosilicate ETS-10." Elsevier, Microporous and Mesoporous Materials, available online at www.sciencedirect.com, 2004, pp. 113-122.
Ji, Z. et al. "Hydrothermal synthesis of titanosilicate ETS-10 using TI(SO4)2." Elsevier, Microporous and Mesoporous Materials, available online at www.sciencedirect.com, 2005, pp. 1-10.
Anderson, M.W. et al. "Structure of the microporous titanosilicate ETS-10". Letters to Nature, Nature, vol. 367, Jan. 27, 1994, pp. 347-350.
Hyun Noh, S. et al. "The effects of (Na + K)/Na molar ratio and kinetic studies on the rapid crystallization of a large pored titanium silicate, ETS-10 using cost efficient titanium oxysulfate, TiOSO4 under stirring." Elsevier, Microporous and Mesoporous Materials, available online at www.sciencedirect.com, 2006, pp. 197-204.

* cited by examiner

*Primary Examiner* — David M Brunsman
(74) *Attorney, Agent, or Firm* — Coats & Bennett, PLLC

(57) ABSTRACT

The present invention relates to a synthesis method for ETS-10 titanosilicate molecular sieves. The method comprises the steps of mixing a titanium oxide hydrosol, a silicon source, a sodium hydroxide, a fluorine-containing mineralizer and a water to give a gel and adjusting the pH thereof to 10.4 to 10.8; and hydrothermal crystallizing the gel at 170 to 250° C. for 10 to 100 hours to obtain the ETS-10 titanosilicate molecular sieves. In the synthesis method for ETS-10 titanosilicate molecular sieves provided by the present invention, a titanium oxide hydrosol is used as the titanium source to synthesize the ETS-10 titanosilicate molecular sieves, and the problem that conventional soluble titanium salt-based titanium sources tend to hydrolyze and the problem of poor dispersibility for the titanium source system of insoluble titanium oxide are therefore prevented. The ETS-10 titanosilicate molecular sieves synthesized has high purity and high crystallinity.

21 Claims, 3 Drawing Sheets

SYNTHESIS METHOD FOR ETS-10 TITANOSILICATE MOLECULAR SIEVE

FIELD OF THE INVENTION

The present invention relates to the field of catalyst carrier preparation, and specifically relates to a synthesis method for ETS-10 titanosilicate molecular sieves.

BACKGROUND ART

U.S. Pat. No. 4,853,202A disclosed a ETS-10 titanosilicate molecular sieve for the first time. In view of structure, the zeolite molecular sieves discovered before the ETS-10 titanosilicate molecular sieves, including aluminosilicate series (Y, β, ZSM-5, and others), aluminophosphate series ($AlPO_4$-n), titanosilicate series (TS-1, TS-2) and the like, all have a skeleton formed of tetra-coordinate $TO_4$ (T includes Si, Al, P, Ti, etc.) structures.

The ETS-10 titanosilicate molecular sieve is distinctly different from conventional zeolite in that its skeletal Ti is present completely in the form of a hexa-coordinate octahedral $(TiO_6)^{2-}$ while the skeletal Si is still present in a tetra-coordinate structure ($SiO_4$), and it has a channel structure of maximum 12-membered rings. In the skeleton of the ETS-10 titanosilicate molecular sieve, different $(TiO_6)^{2-}$ octahedrons form a Ti—O—Ti chain structure known as the titanium chain by connecting opposite apexes via an oxygen bridge, and the four corners are connected with four ($SiO_4$) tetrahedrons via oxygen bridges. Each $(TiO_6)^{2-}$ octahedron has a charge number of −2 that needs to be balanced with positively charged alkali ions (normally $Na^+$ and $K^+$), and is thus endowed with an ion exchange property (M. W. Anderson, O. Terasaki, A. Philippou, et al. Structure of the microporous titanosilicate ETS-10. Nature, 1994, 367: 347-350). Hexacoordinate Ti has properties of $TiO_2$, for example, those for photocatalysis, for acting as a hydrogenation catalyst carrier, etc.

A hydrothermal crystallization method is primarily used for ETS-10 titanosilicate molecular sieve synthesis, which comprises mixing a titanium source and a silicon source and carrying out hydrothermal crystallization at certain alkalinity in the presence of a mineralizer or a template in a closed container at a certain temperature to obtain a ETS-10 titanosilicate molecular sieve.

U.S. Pat. No. 4,853,202A has first disclosed a synthesis method for ETS-10 titanosilicate molecular sieves. The method published in this patent application employs a trivalent titanium compound, e.g. $TiCl_3$, as the titanium source. Trivalent titanium sources are characterized in that they do not hydrolyze directly, but hydrolyze and precipitate only after being converted into tetravalent titanium, which will affect the ultimate synthesis efficiency. Furthermore, trivalent titanium sources are unstable, highly reducing, and instantly decomposed upon exposure to water or air, and stringent requirements are imposed on the operation in the synthesis where such titanium sources are used.

Lu Lv et al. (L. Lv, F. Su, X. S. Zhao, A reinforced study on the synthesis of microporous titanosilicate ETS-10. Microporous and Mesoporous Materials, 2004, 76: 113-122) systematically studied the impact of various titanium sources, including solid $TiO_2$, $TiF_4$, $TiCl_3$ and $(NH_4)_2F_6Ti$, on the synthesis, and proposed different mechanisms for synthesis of ETS-10 titanosilicate molecular sieves using $TiCl_3$ and $TiO_2$ respectively. Among them, the commercial product $TiO_2$ with the code P25 used for synthesizing ETS-10 titanosilicate molecular sieves gives the best effect, but P25-type nanoscale $TiO_2$ is expensive, has relatively high cost in synthesis, and thus is not suitable for industrial application.

Zhaoxia Ji et al. (Z. Ji, B. Yilmaz, J. Warzywoda, et al. Hydrothermal synthesis of titanosilicate ETS-10 using $Ti(SO_4)_2$. Microporous and Mesoporous Materials, 2005, 81(1-3): 1-10) studied various conditions for ETS-10 titanosilicate molecular sieve synthesis using $Ti(SO_4)_2$ as the titanium source. Si Hyun Noh et al. (S. H. Noh, S. D. Kim, Y. J. Chung, et al. The effects of (Na+K)/Na molar ratio and kinetic studies on the rapid crystallization of a large pored titanium silicate, ETS-10 using cost efficient titanium oxysulfate, $TiOSO_4$ under stirring. Microporous and Mesoporous Materials, 2006, 88: 197-204) studied various conditions for ETS-10 titanosilicate molecular sieve synthesis using $TiOSO_4$ as the titanium source, as $TiOSO_4$ is cheap.

CN1724360A discloses a synthesis method for ETS-10 titanosilicate molecular sieves, wherein the ETS-10 titanosilicate molecular sieve is synthesized in the absence of templates, crystal seeds and F ions by using $TiCl_4$ as the titanium source and a sodium silicate solution as the silicon source.

SUMMARY OF THE INVENTION

In order to solve the technical problems mentioned above, the present invention aims at providing a synthesis method for ETS-10 titanosilicate molecular sieves, which method comprises preparing ETS-10 titanosilicate molecular sieves by using titanium oxide hydrosol as a titanium source and is an easily operable method by which a ETS-10 titanosilicate molecular sieve can be steadily synthesized.

For this purpose, provided is a synthesis method for ETS-10 titanosilicate molecular sieves, comprising the steps of mixing a titanium oxide hydrosol, a silicon source, a sodium hydroxide, a fluorine-containing mineralizer and a water to give a gel, and adjusting the pH thereof to 10.4 to 10.8; and hydrothermal crystallizing the gel at 170 to 250° C. for 10 to 100 hours to obtain the ETS-10 titanosilicate molecular sieve.

Preferably, in the above synthesis method provided by the present invention, the raw materials molar ratio of the gel can be controlled as:

titanium oxide hydrosol:silicon source:sodium hydroxide: fluorine-containing mineralizer:water=1.0:(4.5 to 6.5):(3.8 to 5.4):(0.5 to 2.0):(150 to 450), wherein the titanium oxide hydrosol is determined in form of $TiO_2$, the silicon source is determined in form of $SiO_2$, the sodium hydroxide is determined in form of $Na_2O$, the fluorine-containing mineralizer is determined in form of F, and the water is determined in form of $H_2O$.

More preferably, the above molar ratio of the gel is:

titanium oxide hydrosol:silicon source:sodium hydroxide: fluorine-containing mineralizer:water=1.0:(5.3 to 5.8):(4.2 to 4.6):(1.0 to 1.5):(300 to 350).

Preferably, in the above synthesis method provided by the present invention, the silicon source is sodium silicate or the like, and the fluorine-containing mineralizer is potassium fluoride (KF), sodium fluoride (NaF) or the like.

Preferably, in the above synthesis method provided by the present invention, the sodium hydroxide is added in the form of a solution, and the water contained in the sodium hydroxide solution is counted in the water among the materials of the above mixture.

In the above synthesis method provided by the present invention, the pH of the gel may be adjusted by using inorganic acid solutions and/or inorganic alkali solutions such as sulfuric acid, hydrochloric acid, nitric acid, NaOH solution and KOH solution, as long as these solutions can be used to realize the pH adjustment.

The inventor has discovered that the properties of the titanium sources significantly influence the synthesis of ETS-10, and numerous titanium sources can be used to synthesize ETS-10 titanosilicate molecular sieves, typical examples thereof include $TiCl_3$, $TiCl_4$, $TiOSO_4$, $Ti(SO_4)_2$, $(NH_4)_2F_6Ti$, $TiF_4$, regular $TiO_2$ and nanoscale $TiO_2$. However, there are various problems if directly using them as titanium sources, which are attributable to the unique properties of respective titanium sources, as shown in Table 1.

TABLE 1

| | Property | Synthesis Result |
|---|---|---|
| $TiCl_3$ $TiCl_4$ | Unstable, easy to decompose in the air | Relatively pure, no stray crystal |
| $TiOSO_4$ | Unstable, very easy to hydrolyze | Relatively pure, very easy to have stray crystal (normally AM-1, ETS-4) |
| $Ti(SO_4)_2$ | Relatively stable, easy to hydrolyze | |
| Metatitanic acid | Stable, insoluble in water, organic acids and weak inorganic acids, soluble in hot concentrated sulfuric acid | Impure, easy to aggregate, with a large amount of impurities of anatase phase |
| Regular $TiO_2$ | Very stable, insoluble in water, organic acids and weak inorganic acids, soluble in concentrated sulfuric acid having been boiled for a long time | |
| Nanoscale $TiO_2$ | The same as Regular $TiO_2$ | Impure, easy to aggregate, with a small amount of impurities of anatase phase |

As shown in Table 1, the major problems in synthesis of ETS-10 titanosilicate molecular sieves using $TiCl_3$ and $TiCl_4$ as the titanium source are that the titanium source is unstable, easy to decompose in the air, and has to be stored in an acidic medium, which makes the operation more complicated. Although $TiOSO_4$ and $Ti(SO_4)_2$ are relatively stable and can be used to synthesize ETS-10 titanosilicate molecular sieves with high purity, the repeatability of the synthesis using them is poor and it is easy to have stray crystal such as AM-1 and ETS-4 in the synthesis of ETS-10 titanosilicate molecular sieves. When ETS-10 titanosilicate molecular sieves are synthesized using solid $TiO_2$ as the titanium source the product contains stray crystal and tends to aggregate no matter which one of nanoscale $TiO_2$ and regular $TiO_2$ has been used.

Upon analysis of the above results, titanium sources can be divided into two categories, i.e., soluble titanium sources ($TiCl_3$, $TiCl_4$, $TiOSO_4$, and $Ti(SO_4)_2$) and insoluble titanium sources (metatitanic acid and $TiO_2$). Soluble titanium sources are mostly characterised in that they are unstable and easy to hydrolyze, especially in alkaline condition, and the hydrolysis process is uncontrollable; when acidic titanium sources and alkaline titanium sources are mixed, a large amount of hydrolysis precipitation is produced locally so that a homogenous titanosilicate gel cannot be attained and thereby stray crystal is in the product, mostly being AM-1 and ETS-4. As to the technical solutions in which ETS-10 titanosilicate molecular sieves are synthesized with insoluble titanium sources, the titanium source is stable and unable to react with the silicon source, leading to an unstable gel with worse homogeneity and to very poor purity of the product with lots of anatase phase residues. Although nanoscale $TiO_2$ shows a better effect in synthesis of ETS-10 titanosilicate molecular sieves than other insoluble titanium sources because of its small grain size, the overall synthesis effect of insoluble titanium sources is worse than that of soluble titanium sources. The advantages and disadvantages of soluble and insoluble titanium sources in synthesis of ETS-10 titanosilicate molecular sieves are shown in Table 2.

TABLE 2

| | Soluble Titanium Sources | Insoluble Titanium Sources |
|---|---|---|
| Advantages | Liquid phase titanium sources can react with silicon sources to form a relatively homogenous titanosilicate gel, favorable to the synthesis of ETS-10 | Stable titanium sources, do not hydrolyze, not tend to produce stray crystal such as AM-1 and ETS-4 |
| Disadvantages | The titanium source hydrolysis process is difficult to control, and affects synthesis stability | Titanium sources cannot react adequately with silicon sources, resulting in stray crystal, mostly titanium oxide and silicon oxide, due to titanium and silicon residues |

In light of the above facts, the titanium oxide hydrosol, being in a well-dispersed liquid state and being a precursor of titanium oxide, is characterized in that it combines the feature of soluble titanium sources good dispersibility and the feature of insoluble titanium sources being stable and not easy to hydrolyze. In the present invention, an inorganic titanium source is processed and transformed into a titanium oxide hydrosol (abbreviated as titanium sol) which is then used as the titanium source to synthesize ETS-10 titanosilicate molecular sieves, whereby the problems of conventional titanium sources being effectively circumvented.

In the synthesis method provided in the present invention, the titanium oxide hydrosol used may be commercially purchased, or may be prepared in the following steps:

(1) dissolving an inorganic titanium compound in water to obtain a Ti solutions, or alternatively acid hydrolyzing an inorganic titanium compound with sulfuric acid to obtain a Ti solutions;

(2) at the temperature of 10 to 80° C., hydrolyzing the Ti solutions using an alkaline solution and controlling the pH within the range of 3 to 8, to afford a white gel-like precipitation of titanium;

(3) at the temperature of 10 to 80° C., adding an acidic solution to dissolve the precipitation of titanium until the system becomes clear, so as to obtain the titanium oxide hydrosol.

The property of titanium oxide hydrosol is distinctly different from that of a regular titanium salt and solid $TiO_2$. The primary reactions taking place during the preparation are $$TiO^{2+} + OH^- \rightarrow TiO(OH)^+$$

$$TiO(OH)^+ + OH^- \rightarrow TiO(OH)_2 \downarrow \text{ white precipitate}$$

$$TiO(OH)_2 + H^+ \rightarrow TiO_2 + H_2O \text{ colorless or light blue, transparent hydrosol}$$

Firstly, titanium oxide hydrosol differs from soluble titanium sources in that it is a colloidal solution and has the feature of colloidal dispersion, and also in that it is a precursor for preparing solid $TiO_2$ and does not hydrolyze and precipitate. On the other hand, titanium oxide hydrosol differs from insoluble solid $TiO_2$ or meta-titanic acid in that it is present in a liquid state.

Various titanium sources can be used to prepare the titanium oxide hydrosol of the present invention, for example, solutions of most tetravalent titanium salts (e.g., $TiCl_4$, $TiOSO_4$, $Ti(SO_4)_2$, etc.), tetravalent titanate (such as sodium titanate and potassium titanate which need to be acid hydrolyzed with concentrated sulfuric acid to produce the Ti solutions) and titanium oxides (such as meta-titanic acid and the like which need to be acid hydrolyzed with concentrated sulfuric acid to produce the Ti solutions). In the technical solution provided in the present invention, the inorganic titanium compound used in preparing the titanium oxide hydrosol is preferably one or more of $TiCl_4$, $TiOSO_4$, $Ti(SO_4)_2$ and meta-titanic acid.

According to a specific embodiment of the present invention, in step (1) in the preparation of the titanium oxide hydrosol, when the inorganic titanium compound is dissolved in water, the molar ratio between water and the inorganic titanium compound (e.g., $TiCl_4$, $TiOSO_4$, $Ti(SO_4)_2$, etc.) is preferably 20 to 150:1, more preferably 50 to 80:1, wherein the water is determined in form of $H_2O$, and the inorganic titanium compound is determined in form of $Ti^{4+}$.

According to a specific embodiment of the present invention, preferably in step (1) in the preparation of the titanium oxide hydrosol, the temperature during the acid hydrolysis of the inorganic titanium compound (e.g., metatitanic acid) by sulfuric acid is controlled at 60 to 100° C., preferably 80 to 90° C., and the concentration of the sulfuric acid used is 50% to 80% by weight, preferably 60% to 70% by weight. During the acid hydrolysis, the molar ratio between the sulfuric acid and the inorganic titanium compound is controlled at 4:1 or more, preferably (6 to 8):1, wherein the sulfuric acid is determined in form of $H^+$, and the inorganic titanium compound is determined in form of $Ti^{4+}$.

According to a specific embodiment of the present invention, in step (2) in the preparation of the titanium oxide hydrosol, the alkaline solution used is preferably a NaOH solution, a $Na_2CO_3$ solution, a KOH solution, aqueous ammonia, or the like. The concentration of the above alkaline solutions may be 5 to 30% by weight.

According to a specific embodiment of the present invention, in step (2) in the preparation of the titanium oxide hydrosol, when the Ti solutions is hydrolyzed with an alkaline solution, the hydrolysis solution is controlled at pH of 3 to 4.

According to a specific embodiment of the present invention, in step (3) in the preparation of the titanium oxide hydrosol, the acidic solution used is preferably sulfuric acid, hydrochloric acid, nitric acid or the like, more preferably sulfuric acid, among which the concentration of the sulfuric acid may be 10 to 50% by weight, the concentration of the hydrochloric acid may be 20 to 30% by weight, and the concentration of the nitric acid may be 20 to 50% by weight. The acidic solution is added as long as its amount can clarify the system. In step (3), the molar ratio between the acidic solution and the inorganic titanium compound is controlled at 3:1 or more, preferably (3 to 5):1, and more preferably 4:1, wherein the acidic solution is determined in form of $H^+$, and the inorganic titanium compound is determined in form of $Ti^{4+}$.

The synthesis method for ETS-10 titanosilicate molecular sieves provided in the present invention may be carried out in the following detailed steps:

1. Preparation of Titanium Oxide Hydrosol (1) A titanium salt (e.g., $TiCl_4$, $Ti(SO_4)_2$, $TiOSO_4$, etc., preferably $Ti(SO_4)_2$ and $TiOSO_4$) is dissolved in deionized water (the molar ratio between deionized water and the titanium salt is 20 to 150:1 which is measured as $H_2O:Ti^{4+}$) to give a clear Ti solutions. Alternatively, metatitanic acid may be acid hydrolyzed with concentrated sulfuric acid under heating to obtain a Ti solutions, wherein the concentration of the sulfuric acid is 50 to 80% by weight, the heating temperature may be controlled at 60 to 100° C., and the molar ratio between the sulfuric acid and the metatitanic acid is 4:1 or more which is measured as $H^+:Ti^{4+}$.

(2) Tetravalent titanium ions in the Ti solutions are hydrolyzed with an alkaline solution (such as, but not limited to, aqueous ammonia, NaOH, KOH or $Na_2CO_3$) at an appropriate temperature, and the hydrolysis solution is controlled at pH of 3 to 8. At this time, free tetravalent titanium ions are substantially transformed into a white gel, i.e. a white gel-like titanium-containing precipitate, wherein the temperature may be controlled at 10 to 80° C., preferably 40 to 60° C., and more preferably 40° C. During the hydrolysis, strong stirring may be applied to the Ti solutions using a conventional stirring device, and may be particularly operated by currently available means. For example, during stirring with an anchor-type stirring paddle, the stirring rate may be controlled at 400 r/min or above.

(3) The above precipitation of titanium is acid hydrolyzed with an acid solution (e.g. sulfuric acid, nitric acid, hydrochloric acid, or the like) at an appropriate temperature to eventually form a colorless or light blue transparent titanium oxide hydrosol, wherein the temperature is controlled at 10 to 80° C., preferably 40 to 60° C., and more preferably 60° C., and the molar ratio between the acid solution and the precipitation of titanium is 3:1 or more which is measured as $H^+:Ti^{4+}$.

2. Synthesis of the ETS-10 Titanosilicate Molecular Sieve

After sodium silicate, NaOH and water are mixed into a solution, it is further blended with the titanium oxide hydrosol to give a titanosilicate gel, followed by addition of a fluorine-containing mineralizer, so as to obtain a gel, and the gel is adjusted with an acid or base to pH of 10.4 to 10.8, wherein the molar ratio of the titanium oxide hydrosol, sodium silicate, NaOH, the fluorine-containing mineralizer and water, which are measured as the amounts of $TiO_2$, $SiO_2$, $Na_2O$, F and $H_2O$ respectively, is 1.0:(4.5 to 6.5):(3.8 to 5.4):(0.5 to 2.0):(150 to 450).

The gel is hydrothermally crystallized at 170 to 250° C. for 10 to 100 hours, and the product is filtered, washed till pH<9, and dried at 120° C., to afford a powder-like ETS-10 titanosilicate molecular sieve.

The synthesis method for ETS-10 titanosilicate molecular sieves as provided by the present invention has the following substantive features.

1. In the synthesis method for ETS-10 titanosilicate molecular sieves provided by the present invention, a titanium oxide hydrosol is used as the titanium source to synthesize the ETS-10 titanosilicate molecular sieve, and the problem that conventional soluble titanium salt-based titanium sources tend to hydrolyze and the problem of poor dispersibility of the titanium source system of insoluble titanium oxide are therefore prevented. As a result, the ETS-10 titanosilicate molecular sieve synthesized has high purity and high relative crystallinity.

2. The synthesis method of the titanium oxide hydrosol used as a titanium source according to the present invention is simple, in which the white precipitate produced during the hydrolysis of the Ti solutions does not need to be washed. Therefore the procedure is simplified and easily operable.

DETAILED DESCRIPTION OF THE EMBODIMENTS

The technical solutions of the present invention are described in detail below to provide a better understanding of the technical features, purposes and beneficial effects of the present invention. However the following description is not to be construed as limitation to the scope of embodiments of the present invention.

Comparative Example 1

In this comparative example, provided is a synthesis method for a ETS-10 titanosilicate molecular sieve, in which the ETS-10 titanosilicate molecular sieve is synthesized using a conventional soluble titanium salt, $Ti(SO_4)_2$, as the titanium source. The synthesis method comprises the following steps:

mixing 25.86 g $Ti(SO_4)_2$ and 120 g deionized water and stirring the mixture until complete dissolution, to give a titanium source solution;

mixing and stirring 130.00 g sodium silicate and 130 g deionized water until the mixture becomes homogeneous, followed by addition of 108 g of 20 wt % NaOH solution, and stirring to obtain a sodium silicate blended solution, i.e., a silicon source solution;

mixing the titanium source solution and the silicon source solution to afford a white titanosilicate gel; and dissolving 14.56 g $KF.2H_2O$ in 60 g deionized water and adding the solution into the titanosilicate gel, then adjusting the titanosilicate gel with 3 mol/L sulfuric acid to pH of 10.7 followed by 1-hour stirring, charging the final titanosilicate gel into a 1 L high pressure-resistant crystallization kettle, crystallizing at 230° C. for 24 h, and filtering, washing and drying the crystallization product to obtain the ETS-10 titanosilicate molecular sieve.

Figure 1:
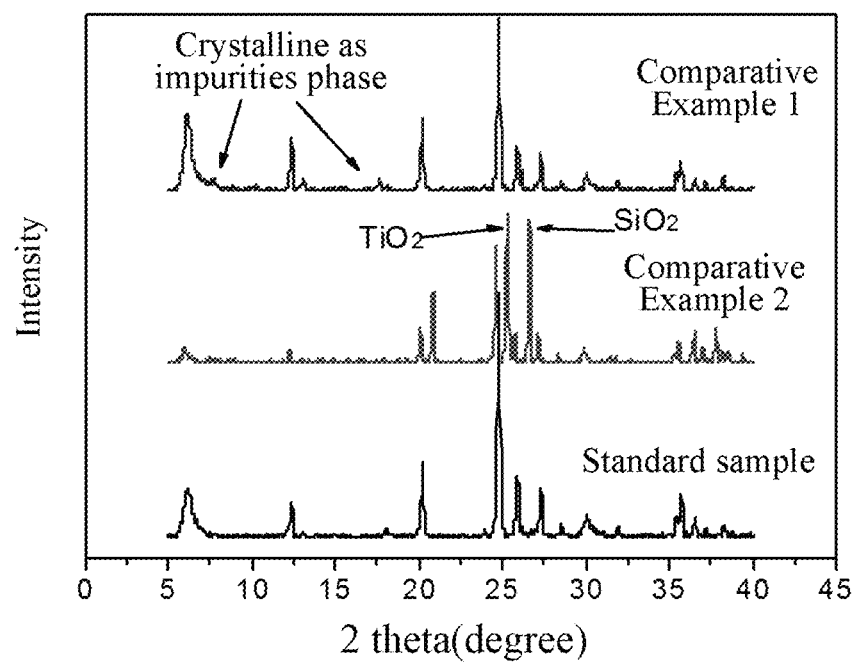
FIG. 1 shows the X ray diffraction patterns of the ETS-10 titanosilicate molecular sieves synthesized in Comparative Example 1 and Comparative Example 2.
Figure 3:
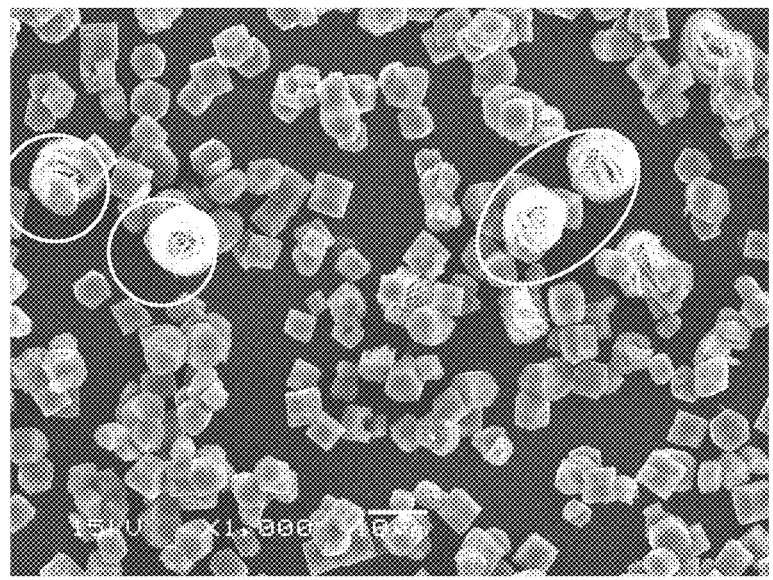
FIG. 3 is the graph of scanning electron microscopy of the ETS-10 titanosilicate molecular sieve synthesized in Comparative Example 1, 1000× magnification, 10 μm scale bar.
Figure 4:
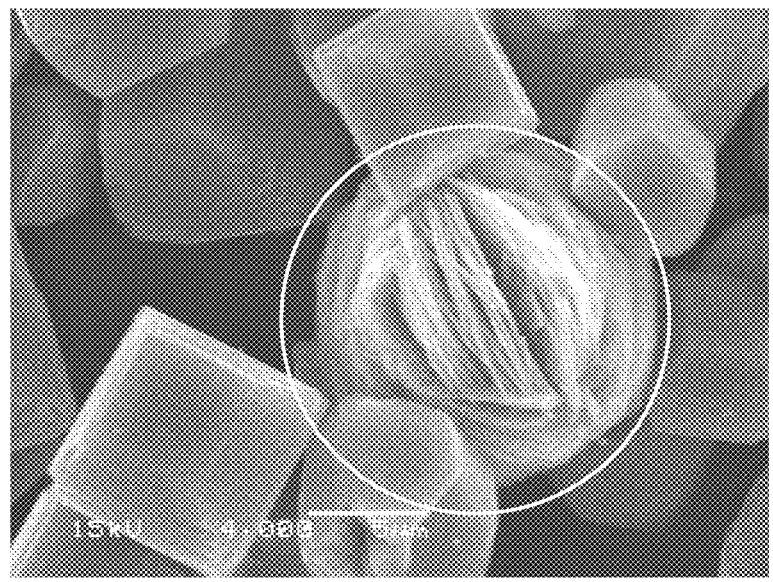
FIG. 4 is the graph of scanning electron microscopy of the ETS-10 titanosilicate molecular sieve synthesized in Comparative Example 1, 4000× magnification, 5 μm scale bar.

The X ray diffraction patterns of the ETS-10 titanosilicate molecular sieve synthesized in this comparative example is shown in FIG. 1, and the graph of the scanning electron microscopy thereof is shown in FIG. 3 and FIG. 4.

Comparative Example 2

In this comparative example, provided is a synthesis method for a ETS-10 titanosilicate molecular sieve, in which the ETS-10 titanosilicate molecular sieve is synthesized using a conventional insoluble titanium oxide, solid $TiO_2$ powder, as the titanium source. The synthesis method comprises the following steps:

mixing 19.5 g solid $TiO_2$ powder and 103.5 g NaCl followed by addition of 300 g deionized water, and stirring the mixture till homogenous to give a titanium source solution;

dropping 300.0 g sodium silicate slowly into the above titanium source solution with sufficient stirring to give a titanosilicate solution;

adding 15.5 g $KF.2H_2O$ into the above titanosilicate solution, adjusting the titanosilicate solution with 3 mol/L sulfuric acid to pH of 10.7, followed by stirring till homogenous, charging the resulting titanosilicate gel into a 1 L high pressure-resistant crystallization kettle, crystallizing at 230° C. for 26 h, and filtering, washing and drying the crystallization product to obtain the ETS-10 titanosilicate molecular sieve.

The X ray diffraction patterns of the ETS-10 titanosilicate molecular sieve synthesized in this comparative example is shown in FIG. 1.

Example 1

25.86 g $Ti(SO_4)_2$ and 120 g deionized water were mixed and stirred until complete dissolution to give a titanium source solution;

Under a 40° C. condition, 45.0 g of 20 wt % NaOH solution was added to completely convert titanium ions into orthotitanic acid precipitate, the system was stirred for 20 min before raising the temperature to 60° C., 211.3 g of 10 wt % sulfuric acid was added, the system was sufficiently stirred until the precipitate was completely dispersed in the liquid phase, so as to obtain a titanium oxide hydrosol which is stored until use;

130.00 g sodium silicate and 100 g deionized water were mixed, to which 72.5 g of 20 wt % NaOH solution was then added, the solution was stirred till homogenous, the above titanium oxide hydrosol was added and the system was stirred till homogenous, and then 14.7 g $KF.2H_2O$ was further added to obtain a titanosilicate gel, wherein the pH of the titanosilicate gel was 10.7;

the obtained titanosilicate gel was charged into a 1 L high pressure-resistant crystallization kettle and subjected to crystallization at 230° C. for 26 h, and the product was then filtered, washed and dried to obtain the ETS-10 titanosilicate molecular sieve.

Figure 2:
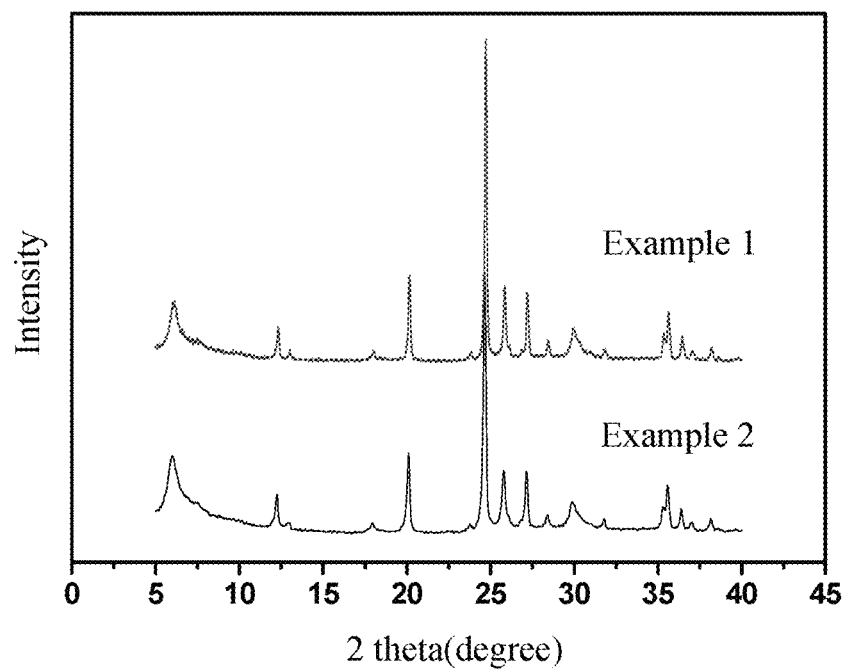
FIG. 2 shows the X ray diffraction patterns of the ETS-10 titanosilicate molecular sieves synthesized in Example 1 and Example 2.
Figure 5:
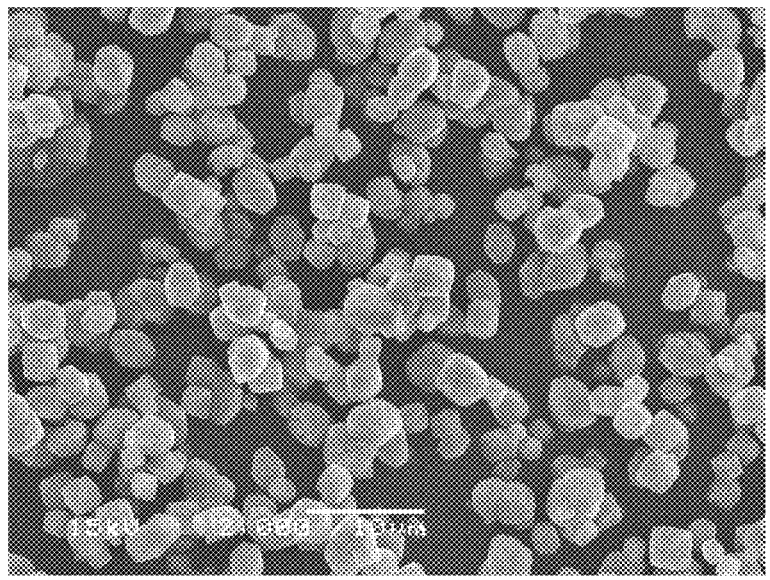
FIG. 5 is the graph of scanning electron microscopy of the ETS-10 titanosilicate molecular sieve synthesized in Example 1, 2000× magnification, 10 μm scale bar.
Figure 6:
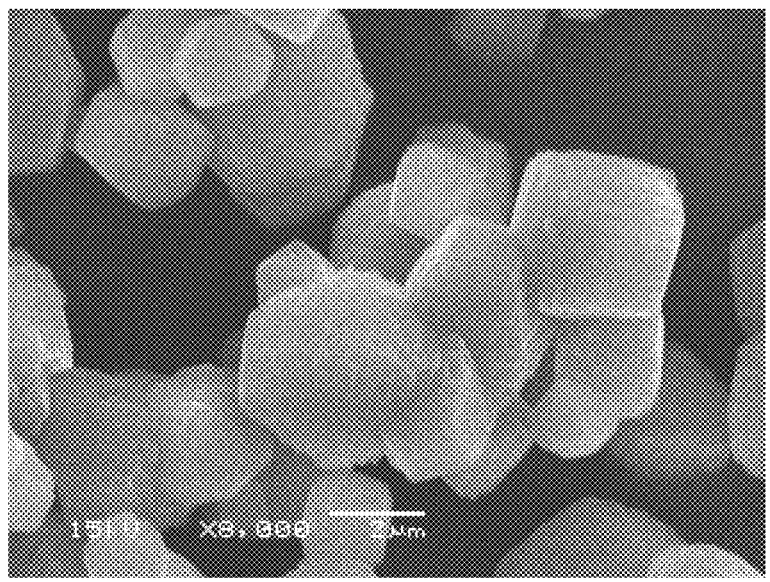
FIG. 6 is the graph of scanning electron microscopy of the ETS-10 titanosilicate molecular sieve synthesized in Example 1, 8000× magnification, 2 μm scale bar.

The X ray diffraction patterns of the ETS-10 titanosilicate molecular sieve synthesized in this example is shown in FIG. 2, and the graph of the scanning electron microscopy thereof is shown in FIG. 5 and FIG. 6.

Example 2

7.0 g metatitanic acid and 100 g of 70 wt % concentrated sulfuric acid were mixed and heated using an electric hob till boiling, and the system was stirred until the precipitate was completely dissolved in the liquid phase;

200 g deionized water was added, and under, a sufficient amount of 10 wt % NaOH solution was added at 40° C. to completely convert titanium ions into orthotitanic acid precipitate;

after the orthotitanic acid precipitate was filtered and washed, it was mixed with 264 g of 10 wt % sulfuric acid at 60° C., and the system was then sufficiently stirred until the precipitate was completely dispersed in the liquid phase, so as to obtain a titanium oxide hydrosol which was stored until use;

130.00 g sodium silicate and 100 g deionized water were mixed, to which 115.0 g of 20 wt % NaOH solution was added, the solution was stirred till homogenous, then the above titanium oxide hydrosol was added and the solution was stirred till homogenous, 14.7 g $KF.2H_2O$ was further added to obtain a titanosilicate gel, and the titanosilicate gel was adjusted to pH of 10.7 by adding 52.8 g of 10 wt % sulfuric acid;

the obtained titanosilicate gel was charged into a 1 L high pressure-resistant crystallization kettle and subjected to crystallization at 230° C. for 26 h, and then the product was filtered, washed and dried to obtain the ETS-10 titanosilicate molecular sieve.

The X ray diffraction patterns of the ETS-10 titanosilicate molecular sieve synthesized in this example is shown in FIG. 2.

As can be seen from the X ray diffraction patterns shown in FIG. 1, although the product of Comparative Example 1 is primarily composed of ETS-10 titanosilicate molecular sieve, there are stray crystal in the product compared to the standard sample; and in the product of Comparative Example 2, stray crystal predominate with less ETS-10 titanosilicate molecular sieve, and the stray crystal are mostly incompletely crystallized $TiO_2$ and $SiO_2$. The above mentioned standard sample is a pure ETS-10 titanosilicate molecular sieve without stray crystal, see "A reinforced study on the synthesis of microporous titanosilicate ETS-10" (L. Lv, F. Su, X. S. Zhao, A reinforced study on the synthesis of microporous titanosilicate ETS-10. Microporous and Mesoporous Materials, 2004, 76: 113-122) for details, the entire content of which is herein incorporated by reference.

As seen from FIG. 3 and FIG. 4, the product of Comparative Example 1 has a large grain size close to 6 to 10 nm and has stray crystal as indicated by the circles.

As seen from the X ray diffraction patterns shown in FIG. 2, the product of Example 1 using titanium oxide hydrosol as the titanium source has high purity and does not have any stray crystal.

As seen from FIG. 5 and FIG. 6, the product of Example 1 has a uniform grain size of about 3 to 5 µm and does not have stray crystal.

Based on the above comparisons, it is discovered that the ETS-10 titanosilicate molecular sieve obtained by the synthesis method provided in the present invention has high purity, a small grain size, and high crystallinity, as opposed to the ETS-10 titanosilicate molecular sieves synthesized by conventional methods.

The invention claimed is:

1. A synthesis method for synthesizing an ETS-10 titanosilicate molecular sieve, comprising:
    mixing a titanium oxide hydrosol, a silicon source, sodium hydroxide, a fluorine-containing mineralizer and water to form a gel;
    adjusting the pH thereof to 10.4 to 10.8; and
    hydrothermal crystallizing the gel at 170 to 250° C. for 10 to 100 hours to obtain the ETS-10 titanosilicate molecular sieve.

2. The synthesis method according to claim 1, wherein the gel has a molar ratio of titanium oxide hydrosol:silicon source:sodium hydroxide:fluorine-containing mineralizer:water that is 1.0:(4.5 to 6.5):(3.8 to 5.4):(0.5 to 2.0):(150 to 450), and wherein the amount of the titanium oxide hydrosol is measured in terms of $TiO_2$, the amount of the silicon source is measured in terms of $SiO_2$, the amount of the sodium hydroxide is measured in terms of $Na_2O$, the amount of the fluorine-containing mineralizer is measured in terms of F, and the amount of the water is measured in terms of $H_2O$.

3. The synthesis method according to claim 2, wherein in the gel the molar ratio of titanium oxide hydrosol:silicon source:sodium hydroxide:fluorine-containing mineralizer:water is 1.0:(5.3 to 5.8):(4.2 to 4.6):(1.0 to 1.5):(300 to 350).

4. The synthesis method according to claim 1, wherein the silicon source is sodium silicate and the fluorine-containing mineralizer is potassium fluoride or sodium fluoride.

5. The synthesis method according to claim 1, wherein the sodium hydroxide is added in the form of a solution.

6. The synthesis method according to claim 1, wherein the titanium oxide hydrosol is prepared by:
    (1) forming a titanium-containing solution;
    (2) at the a temperature of 10 to 80° C. and a pH within the range of 3 to 8, hydrolyzing the titanium-containing solution using an alkaline solution to afford a white gel-like titanium-containing precipitation; and
    (3) at a temperature of 10 to 80° C., adding an acidic solution to acid-hydrolyze and disperse the titanium-containing precipitation until a transparent titanium oxide hydrosol is obtained.

7. The synthesis method according to claim 6, wherein the titanium solution is created by dissolving an inorganic titanium compound in water or by acid hydrolyzing an inorganic titanium compound with sulfuric acid.

8. The synthesis method according to claim 7, wherein dissolving the inorganic titanium compound in water, is performed where the molar ratio between the water and the inorganic titanium compound is 20 to 150:1, and wherein the amount of the water is measured in terms of $H_2O$, and the amount of the inorganic titanium compound is measured in terms of $Ti^{4+}$.

9. The synthesis method according to claim 7, wherein the inorganic titanium compound is acid hydrolyzed with sulfuric acid, and at a temperature of 60 to 100° C.

10. The synthesis method according to claim 7, wherein the sulfuric acid is at a concentration of 50% to 80% by weight.

11. The synthesis method according to claim 10, wherein the molar ratio between the sulfuric acid and the inorganic titanium compound is 4:1 or more, wherein the amount of the sulfuric acid is measured in terms of H+, and the amount of the inorganic titanium compound is measured in terms of $Ti^{4+}$.

12. The synthesis method according to claim 10, wherein, the molar ratio between the sulfuric acid and the inorganic titanium compound is (6 to 8):1.

13. The synthesis method according to claim 6, wherein the inorganic titanium compound is selected from the group consisting of $TiCl_4$, $TiOSO_4$, $Ti(SO_4)_2$, metatitanic acid, and combinations thereof.

14. The synthesis method according to claim 6, wherein the alkaline solution is selected from the group consisting of a NaOH solution, a $Na_2CO_3$ solution, a KOH solution, and aqueous ammonia.

15. The synthesis method according to claim 14, wherein, the concentration of the alkaline solution is 5% to 30% by weight.

16. The synthesis method according to claim 6, wherein the pH in step (2) is controlled at 3 to 4, while the titanium-containing solution is hydrolyzed with an alkaline solution.

17. The synthesis method according to claim 6, wherein, the acidic solution is selected from the group consisting of sulfuric acid, hydrochloric acid, and nitric acid.

18. The synthesis method according to claim 17, wherein the acidic solution is sulfuric acid.

19. The synthesis method according to claim 17, wherein concentration of the sulfuric acid is 10 to 50% by weight, the concentration of the hydrochloric acid is 20 to 30% by weight, and the concentration of the nitric acid is 20 to 50% by weight.

20. The synthesis method according to claim 6, wherein the molar ratio between the acidic solution and the titanium-containing precipitation is 3:1 or more, wherein the amount of the acidic solution is measured in terms of H+, and wherein the amount of the titanium-containing precipitation is measured in terms of $Ti^{4+}$.

21. The synthesis method according to claim 20, wherein the molar ratio between the acidic solution and the titanium-containing precipitation is (3 to 5):1.

\* \* \* \* \*